United States Patent
Kemeny et al.

(10) Patent No.: US 11,744,674 B2
(45) Date of Patent: *Sep. 5, 2023

(54) TWO-COMPONENT MIXING CAPSULE, IN PARTICULAR FOR DENTAL PURPOSES

(71) Applicant: KULZER GMBH, Hanau (DE)

(72) Inventors: Andrea Kemeny, Friedrichsdorf (DE); Mike Kondziela, Weilburg (DE); Ralf Suffel, Großostheim (DE); Andreas Utterodt, Neu-Anspach (DE); Michael Eck, Schmitten (DE); Raif Kocoglu, Grävenwiesbach (DE); Markus Balkenhol, Neuberg (DE)

(73) Assignee: KULZER GMBH, Hanau (DE)

( * ) Notice: Subject to any disclaimer, the term of this patent is extended or adjusted under 35 U.S.C. 154(b) by 733 days.

This patent is subject to a terminal disclaimer.

(21) Appl. No.: 16/616,721

(22) PCT Filed: May 24, 2018

(86) PCT No.: PCT/EP2018/063945
§ 371 (c)(1),
(2) Date: Nov. 25, 2019

(87) PCT Pub. No.: WO2018/219872
PCT Pub. Date: Dec. 6, 2018

(65) Prior Publication Data
US 2021/0169608 A1    Jun. 10, 2021

(30) Foreign Application Priority Data

May 30, 2017 (DE) ..................... 10 2017 111 725.3

(51) Int. Cl.
*A61C 5/66* (2017.01)
*A61C 5/68* (2017.01)
(Continued)

(52) U.S. Cl.
CPC .................. *A61C 5/66* (2017.02); *A61C 5/64* (2017.02); *A61C 5/68* (2017.02); *B01F 23/53* (2022.01);
(Continued)

(58) Field of Classification Search
CPC .... A61C 5/66; A61C 5/64; A61C 5/68; B01F 23/53; B01F 23/57; B01F 27/23;
(Continued)

(56) References Cited

U.S. PATENT DOCUMENTS 2,381,785 A * 8/1945 Thompson ........... A61C 9/0026
433/90
3,659,749 A * 5/1972 Schwartz .......... B01F 33/50112
222/386
(Continued)

FOREIGN PATENT DOCUMENTS

DE        3723985 A1 * 2/1988
DE        3920537 A1 * 2/1990
(Continued)

*Primary Examiner* — Charles Cooley
(74) *Attorney, Agent, or Firm* — Norris McLaughlin, P.A.

(57) ABSTRACT

The disclosure relates to a two-component mixing capsule for intake and for mixing of two compositions with a capsule housing having a discharge spout at its front end, wherein the mixing capsule comprises a first mixing chamber and a second mixing chamber, wherein the two mixing chambers may be separated from each other for storage or for transport, by the first mixing chamber being rotatable into a first position in which the first mixing chamber is separated from mixing chamber, by a rotatably mounted handhold element, the rotational axis of which is approximately perpendicularly arranged to the longitudinal axis of the mixing capsule. The two mixing chambers form a common mixing chamber by rotating the first mixing chamber into a second position in which the central axes of the first and second mixing (Continued)

chamber are substantially coaxially arranged, wherein the composition may be discharged after mixing by attaching a squeezing piston.

19 Claims, 12 Drawing Sheets

(51) Int. Cl.
| | |
|---|---|
| *A61C 5/64* | (2017.01) |
| *B65D 81/32* | (2006.01) |
| *B01F 23/53* | (2022.01) |
| *B01F 23/57* | (2022.01) |
| *B01F 27/23* | (2022.01) |
| *B01F 27/50* | (2022.01) |
| *B01F 33/501* | (2022.01) |
| *B01F 35/52* | (2022.01) |
| *B01F 35/50* | (2022.01) |
| *B01F 35/32* | (2022.01) |
| *B01F 35/75* | (2022.01) |
| *B01F 35/30* | (2022.01) |
| *B01F 101/19* | (2022.01) |
| *B01F 101/00* | (2022.01) |

(52) U.S. Cl.
CPC ............. *B01F 23/57* (2022.01); *B01F 27/23* (2022.01); *B01F 27/50* (2022.01); *B01F 33/50112* (2022.01); *B01F 35/3202* (2022.01); *B01F 35/52* (2022.01); *B01F 35/54* (2022.01); *B01F 35/75425* (2022.01); *B65D 81/3255* (2013.01); *B01F 2035/3512* (2022.01); *B01F 2101/19* (2022.01); *B01F 2101/2305* (2022.01)

(58) Field of Classification Search
CPC ............. B01F 27/50; B01F 33/50112; B01F 35/3202; B01F 35/52; B01F 35/54; B01F 35/75425; B01F 2035/3512; B01F 2101/19; B01F 2101/2305; B65D 81/3255; B65D 81/32; B65D 81/3222
See application file for complete search history.

(56) References Cited

U.S. PATENT DOCUMENTS

| | | | | |
|---|---|---|---|---|
| 3,889,674 A * | 6/1975 | Cilento | ............ | A61M 5/31596 604/82 |
| 4,175,658 A * | 11/1979 | Moser | ............ | A61C 5/66 604/416 |
| 4,515,267 A * | 5/1985 | Welsh | ............ | A61C 5/66 222/386 |
| 4,648,532 A * | 3/1987 | Green | ............ | A61C 5/66 222/386 |
| 5,026,283 A * | 6/1991 | Osanai | ............ | A61C 5/66 604/87 |
| RE33,801 E * | 1/1992 | Green | ............ | A61C 5/66 222/386 |
| 5,083,921 A * | 1/1992 | Dragan | ............ | A61C 5/66 433/90 |
| 5,088,830 A * | 2/1992 | Muhlbauer | ............ | B01F 31/23 366/602 |
| 5,158,546 A * | 10/1992 | Haber | ............ | A61J 1/2093 604/416 |
| 5,165,890 A * | 11/1992 | Discko, Jr. | ............ | A61C 5/66 433/90 |
| 5,172,807 A * | 12/1992 | Dragan | ............ | A61C 5/64 222/129 |
| 5,678,709 A * | 10/1997 | Holley | ............ | B65D 81/3211 215/11.4 |
| 5,871,355 A * | 2/1999 | Dragan | ............ | A61C 5/66 433/90 |
| 6,095,814 A * | 8/2000 | Petrich | ............ | A61C 5/66 222/137 |
| 6,375,460 B1 * | 4/2002 | Plaumann | ............ | A61C 5/64 433/80 |
| 6,386,872 B1 * | 5/2002 | Mukasa | ............ | A61C 5/64 222/570 |
| 6,869,284 B2 * | 3/2005 | Aoyagi | ............ | A61C 5/66 604/218 |
| 7,311,195 B2 * | 12/2007 | Schmid | ............ | B01F 33/50112 222/129 |
| 8,968,000 B2 * | 3/2015 | Leiner | ............ | A61C 5/64 433/90 |
| 9,326,829 B2 * | 5/2016 | Kojima | ............ | A61C 5/62 |
| 9,775,690 B2 * | 10/2017 | Cheetham | ............ | A61C 9/0026 |
| 9,913,699 B2 | 3/2018 | Barg et al. | | |
| 10,117,726 B2 * | 11/2018 | Boehm | ............ | A61C 5/64 |
| 10,143,535 B2 * | 12/2018 | Peuker | ............ | B65D 81/3255 |
| 11,413,116 B2 * | 8/2022 | Suffel | ............ | A61C 5/64 |
| 2002/0076671 A1 * | 6/2002 | Evers | ............ | A61C 5/66 433/90 |
| 2002/0098462 A1 * | 7/2002 | Kaneko | ............ | A61C 5/62 433/90 |
| 2007/0272567 A1 * | 11/2007 | Peuker | ............ | A61C 5/64 206/219 |
| 2011/0017777 A1 * | 1/2011 | Nakatsuka | ............ | B65D 81/3211 222/145.5 |
| 2015/0090615 A1 * | 4/2015 | Sasaki | ............ | B65D 81/3255 206/219 |
| 2015/0090745 A1 * | 4/2015 | Sasaki | ............ | B05C 17/00503 222/536 |
| 2016/0199166 A1 | 7/2016 | Barg et al. | | |
| 2017/0027663 A1 * | 2/2017 | Pauser | ............ | A61C 5/68 |
| 2018/0368939 A1 * | 12/2018 | Suffel | ............ | A61C 5/66 |
| 2020/0093568 A1 * | 3/2020 | Kemeny | ............ | B65D 81/3222 |
| 2021/0169608 A1 * | 6/2021 | Kemeny | ............ | B01F 35/54 |
| 2021/0186656 A1 * | 6/2021 | Kemeny | ............ | A61C 5/68 |
| 2023/0102200 A1 * | 3/2023 | Clark | ............ | A61C 5/62 433/90 |

FOREIGN PATENT DOCUMENTS

| | | | | |
|---|---|---|---|---|
| DE | 10 2015 121 453 A1 | 6/2017 | | |
| DE | 102015121453 A1 * | 6/2017 | ............ | A61C 5/64 |
| DE | 102017111725 A1 * | 12/2018 | ............ | A61C 5/64 |
| DE | 102017111731 A1 * | 12/2018 | ............ | A61C 5/64 |
| EP | 2510987 A2 * | 4/2012 | | |
| EP | 2853311 A1 * | 4/2015 | ............ | B01F 15/0279 |
| EP | 3 045 143 A1 | 7/2016 | | |
| JP | S 49 49796 A | 5/1974 | | |
| WO | 93/11049 A1 | 6/1993 | | |
| WO | WO-2008064283 A2 * | 5/2008 | ............ | A61C 5/062 |
| WO | WO-2015160552 A1 * | 10/2015 | ............ | A61C 5/64 |

* cited by examiner

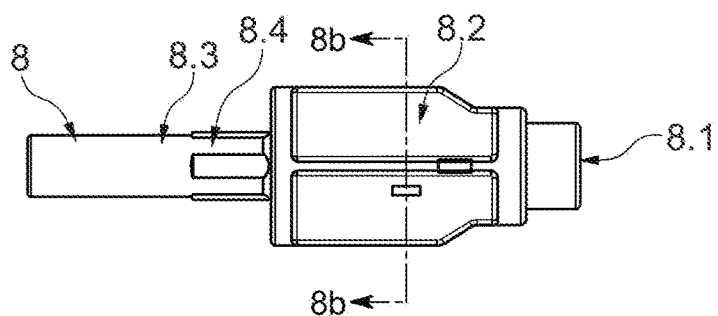
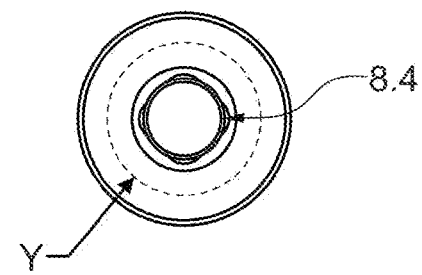
Fig. 8a    Fig. 8b
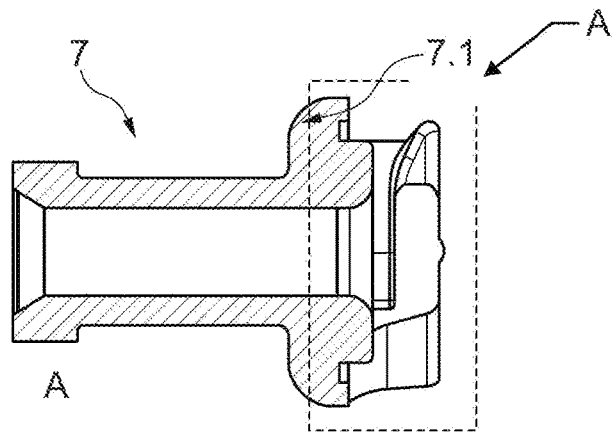
Fig. 9
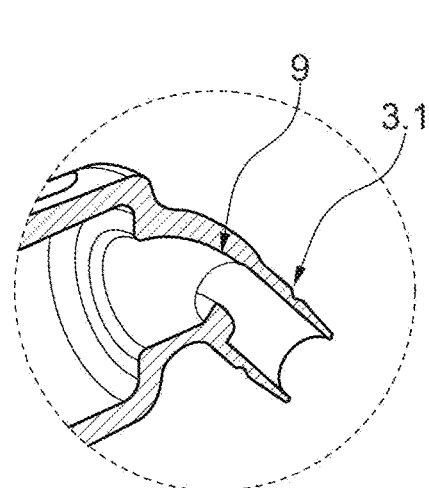
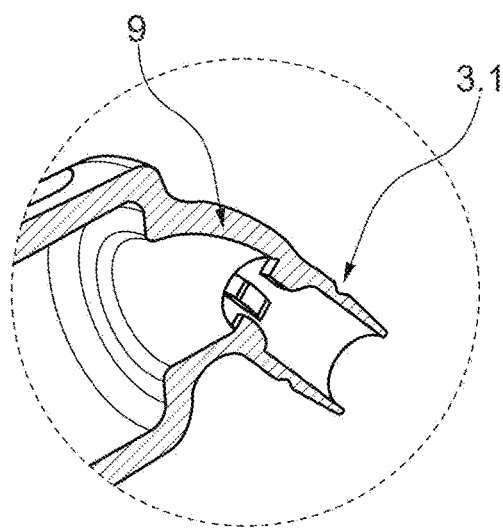
Fig. 10a    Fig. 10b

TWO-COMPONENT MIXING CAPSULE, IN PARTICULAR FOR DENTAL PURPOSES

This application is a 371 of PCT/EP2018/063945, filed May 28, 2018, which claims foreign priority benefit under 35 U.S.C. § 119 of German Patent Application No. 10 2017 111 725.3, filed May 30, 2017, the disclosures of which are incorporated herein by reference.

The invention relates to a two-component mixing capsule for intake and for mixing of two, preferably powdered or preferably pasty or kneadable, particularly preferably dental, compositions with a capsule housing having a discharge spout at its front end, wherein the mixing capsule comprises a first mixing chamber and a second mixing chamber, the two mixing chambers may be separated from each other for storage or for transport, by the first mixing chamber being rotatable into a first position in which the first mixing chamber is separated from the second mixing chamber, by a rotatably mounted handhold element, the rotational axis (Y) of which is approximately perpendicularly arranged to the longitudinal axis (Z) of the mixing capsule, preferably of the second mixing chamber, preferably the central axes of the mixing chambers are arranged to each other by approximately 90°. The two mixing chambers form a common mixing chamber by rotating the first mixing chamber into a second position in which the central axes of the first and second mixing chamber are substantially coaxially arranged, wherein the composition may be discharged after mixing by attaching a squeezing piston.

Another subject matter of the invention is a method as well as the use of the mixing capsule according to the invention for mixing and applying two-component compositions, preferably of dental 2K-compositions.

The state of the art discloses a variety of mixing capsules in dental field being suitable for storing and mixing two-component compositions. Usually, a characteristic feature of mixing capsules in dental field is their short length of approximately 32 mm, which allows the mixing capsule to be inserted into the holding forks of well-known mixing devices. State of the art mixing capsules normally have two chambers separated by a film having a predetermined breaking point, each of which comprising one of the two components of the two-component composition, wherein a piston punctures this film prior to mixing. After mixing, a tool may be inserted into the mixing capsule that displaces a discharge piston in the mixing capsule and A disadvantage of the known mixing capsules is that they are usually designed to mix a liquid monomer component with a powdered component. The state of the art discloses almost no economically producible or easy-to-use mixing capsules being able to mix two pasty to kneadable 2K-component compositions with each other. Further, various locking mechanisms preventing inadvertent puncture of the film must be provided on the state of the art capsules.

It was the object of the invention to develop a mixing capsule allowing storage and mixing of pasty to kneadable, and optionally with powdered or preferably pasty to solid and at the same time thixotropic multiple-component compositions, wherein pasty with powdered components may also be mixed where appropriate. Further, the object was to dimension the mixing capsule so that it is insertable into usual mixing apparatuses, as they are used in dental surgeries.

The objects were solved by a mixing capsule as well as by a method and the use described herein.

In the mixing capsule according to the invention, two dental compositions may be stored and mixed, as well as the resulting mixed composition may be applied by displacing the sealing piston from the back end of the capsule housing to the front end of the capsule housing. A subject matter of the invention is a multi- or two-component (2K) mixing capsule for intake, in particular storage, and for mixing of at least two, in particular pasty, kneadable to solid, preferably thixotropic and preferably dental, compositions with a capsule housing having a discharge opening at its front end, such as a discharge opening right at the housing or, in particular, an integral discharge spout or attached discharge spout, wherein the mixing capsule has a rotary element rotatably mounted or rotatably arranged in the capsule housing, in particular a single rotary element, wherein preferably the rotational axis (Y) of the rotary element is approximately perpendicularly arranged to the longitudinal axis (Z) of the mixing capsule, and a rotatably mounted first mixing chamber is assigned to the rotary element, and a second mixing chamber is preferably arranged in the capsule housing. Preferably, the rotational axis of the rotary element is approximately perpendicularly arranged to the longitudinal axis of the mixing capsule. The rotatably mounted first mixing chamber assigned to the rotary element is present as pipe section or one-side closed sleeve preferably. The pipe section or the sleeve preferably forms an integral component with the rotary element. Alternatively, a separated mixing chamber may be fixed form-locked with the rotary element. Like this, for example, the mixing chamber may be locked with the rotary element, in particular in a clip. The rotational axis of the rotary element is approximately perpendicularly arranged to the longitudinal axis of the mixing capsule.

A rotational element is preferably understood to mean a surface element, optionally a planar surface element or an arched surface element, preferably having locking cams for movable, rotatable engagement into the opening of the capsule housing. The first mixing chamber is arranged at the flat, preferably approximately circular rotary element. In a particularly preferred embodiment, the rotary element with locking cams and the first mixing chamber is an integral component.

According to the invention, it is preferred for the second mixing chamber to be arranged in the region of the front end of the mixing capsule, in particular between the discharge spout and the first mixing chamber. In addition, the discharge opening is arranged at the front end in the direction of the longitudinal axis of the capsule housing and the sealing piston is arranged at the back end in the direction of the longitudinal axis. The sealing piston is slidable in the mixing capsule, in particular along the longitudinal axis when the first and the second mixing capsule form the common mixing chamber.

A mixing capsule according to the invention has a capsule housing having an opening in the central region of the capsule housing to receive the rotary element, in particular a single opening to receive a rotary element, as well as an opening located in the back region to receive a sealing piston, as well as also a discharge opening located in the front region of the capsule housing, wherein the rotary element comprising the first mixing chamber is arranged in the opening to receive the rotary element, in particular the rotatably mounted rotary element and the first mixing chamber which is preferably in the form of a pipe section or a one-side closed sleeve, form a one-piece component, in particular an integral component, preferably the sealing piston is arranged in the opening located in the back region. Apart from that, the capsule housing preferably has a constantly close housing wall.

According to a preferred alternative, the rotary element is arranged on the top side of the capsule housing, or the rotary element is arranged on one of the sides of the capsule housing, or the rotary element is arranged on the bottom side of the capsule housing. The preferred arrangement of the rotary element depends on the geometry of the mixing device or the geometry of the discharge device. The bottom side is understood to mean the side of the capsule housing where the discharge opening is arranged.

Further, a subject matter of the invention is a mixing capsule with a rotary element into or onto which a separated handhold element, such as a knob or an elongated form body, is pluggable, or into which a separated handhold element or the squeezing piston is insertable, in particular a handhold element is insertable into at least one opening of the rotary element. The rotary element shall facilitate the setting of the first and second mixing capsule in relation to each other prior to and after mixing. According to an alternative, the rotary element may also have an integral handhold element, such as for example an outwardly running or flat approximately perpendicularly protruding surface element. According to a further alternative, the rotary element may have at least one groove. Preferably, an auxiliary means to increase the torque may be inserted into the groove. Both the groove and also the auxiliary means may have usual profilings. The handhold element may be arranged almost perpendicularly disc-shaped or as pin on the rotary element, or may have at least two arched recesses to receive two fingers.

According to an alternative, the rotary element has a polygonal opening or an opening with a one-fold to multi-fold rotational axis, in particular an internal polygonal socket opening, into which the squeezing piston with its front region which has a corresponding polygonal profile or a profile having a one-fold to multi-fold rotational axis is insertable. Preferably, the squeezing piston has an external polygon socket profile in the front region fitting the polygonal opening. Preferred profiles are internal hexagonal socket profile and external hexagonal socket profile. In general, other profiles such as star-shaped, tooth-shaped or flower-shaped profiles are also conceivable.

The two pasty, kneadable to solid, preferably thixotropic and preferably dental, compositions, such as composition A and composition B, are preferably separated in the first and second mixing chamber as single pasty to kneadable composition, in particular as one-piece composition preferably. Alternatively, the composition may be present in the form of several components, in particular one component has at least 1.5 mm in one dimension. The composition is not preferably powdered.

A wall-like ridge or differently shaped ridge may be formed at the one rotary element as handhold for easier rotating. The mixing capsule according to the invention with capsule housing and without guiding adapter and without squeezing piston preferably has a length of less than or equal to 10 cm, preferably less than or equal to 8 cm, particularly preferably a length of less than or equal to 5 cm or less than or equal to 3.5 cm. The total mixing chamber of the mixing capsule preferably has a length of 2.0 to 4.0 cm, in particular of 2.5 to 3.0 cm with a diameter of 0.5 to 2.0 cm, in particular of 0.8 to 1.2 cm. The volume of the total mixing chamber is approximately from 20 to 200 mm$^3$, in particular from 50 mm$^3$ to 135 mm$^3$. The mixing capsule according to the invention is formed such that it may be inserted into usual PLT discharge devices or PLT applicators, respectively.

The rotatably mounted mixing chamber may be arranged within a pipe section or in a one-side closed pipe section as one-side closed sleeve. Preferably, the first mixing chamber is arranged in a pipe section being integrally connected with the rotatably mounted rotary element. The first or the second mixing chamber are to be understood as being parts of the producible total mixing chamber and may form the total mixing chamber, in which the mixing is preferably made.

According to a preferred embodiment, the rotary element rotatably mounted or rotatably arranged in the capsule housing is locked with the capsule housing or plugged together and rotatably connected with the capsule housing. Connection of the rotary element with the capsule housing may, for example, be carried out by means of locking cams at the capsule housing. According to the invention, a rotatable rotary element or rotatable mixing chamber, pipe section or sleeve is understood to mean that the aforementioned components are rotatable by at least 30°, preferably at least by 90°, about a rotational axis being approximately perpendicular to the longitudinal axis of the capsule housing or perpendicular to the longitudinal axis of the second mixing chamber, respectively, preferably the components are rotatable by at least 360°. If the components are rotatable by 360°, it may be preferred to attach markings, showing the position of the first mixing chamber, in particular in relation to the second mixing chamber. Preferably, the rotary element and/or the mixing chamber has locking cams so that the user feels when he has set the exact coaxial position of the mixing chamber.

Further, it is preferred for the first mixing chamber to be arranged at the rotary element rotatably mounted in the capsule housing, in particular the rotatably mounted rotary element and the first mixing chamber form a one-piece component, in particular an integral component. Preferably, the mixing capsule may be present in the form of a pipe section or, in an alternative, as one-side closed pipe section, for example as one side-closed cylindrical sleeve, wherein it is preferably present as integral component with the rotary element. The pipe section may be cylindrical, elliptical, oval, circular, as well as polygonal, such as rectangular or hexagonal.

Preferably, the pipe section or the one-side closed cylindrical sleeve has, at least in part, an arched contour at their open ends at two opposing end of the shell surfaces, in particular the ends of the shell surfaces have a contour which is rotatably and closely located on a cylindrical or non-cylindrical but circular inner surface of the shell surface of the capsule housing. In this context, it is preferred for two opposing ends of the shell surfaces to have a contour of a segment of a circle. Optionally, the open ends have a circumferenting wavelike contour, in particular the pipe section or the one-side closed cylindrical sleeve are rotatable and closely attachable to the inner wall of the housing in a circular central region of the capsule housing.

According to two alternatively preferred embodiments, the mixing capsule has a pipe section connected to the rotatably mounted rotary element, or a one-side closed cylindrical sleeve, forming the first mixing chamber, wherein either a) the second mixing chamber is located in the front region in the capsule housing or b) the second mixing chamber is located in the back region in the capsule housing. In this context, it is preferred for the pipe section or the sleeve to form an integral component with the rotary element. Alternatively, the mixing chamber being present as separated component may be fixed form-locked with the rotary element.

The mixing capsule according to the invention may be transferred into different positions for storage, mixing or applying. Like this, the mixing capsule according to the invention with the rotatably mounted rotary element which is connected, in particular integrally connected, with the pipe section, may form the first mixing chamber, and the second mixing chamber is located in the front region in the capsule housing, wherein the mixing capsule a) is in a first position, e.g. for storage or for transport, when the longitudinal axis (Z1) of the pipe section is preferably twisted by approximately 90° to the longitudinal axis (Z) of the capsule housing so that the first mixing chamber, in particular comprising a composition B, and the second mixing chamber, in particular comprising a composition A, are separated from each other, or wherein the mixing capsule b) is in a second position, e.g. "mixing position mixing" when the longitudinal axis (Z1) of the pipe section is preferably substantially coaxial to the longitudinal axis (Z) of the capsule housing or of the second mixing chamber so that the first mixing chamber and the second mixing chamber form a common mixing chamber, in particular comprising compositions A and B, alternatively the mixing capsule is in the second position when the pipe section or the one-side closed sleeve comprising the first mixing chamber are twisted such that the first and the second mixing chamber form a common mixing chamber, and, wherein the mixing capsule in b) of the second position is also in a discharge position c) when the guiding adapter with movable squeezing piston is arranged at the back end of the capsule housing, wherein the movable squeezing piston may displace the sealing piston through the first mixing chamber and the second mixing chamber in the direction toward the front end of the capsule housing or in the direction toward the back region in the discharge spout. The sealing piston may preferably be pushed by the squeezing piston in the capsule housing in the direction toward the discharge opening so that the mixed composition C may be pushed by the sealing piston in the direction toward the discharge opening and pressed out from the discharge opening.

The mixing chambers are to be understood as separated when they are spatially separated from each other and compositions A and B may not interact with each other.

Preferably, the rotary element has at least one locking means, such as a locking cam, and optionally the capsule housing of the mixing capsule has at least one locking means, such as a recess, which preferably interlock as positive and negative in the second position of the mixing capsule, in which a common mixing chamber is formed by the first mixing chamber and the second mixing chamber. Thus, the position in which the first mixing chamber and the second mixing chamber form a common mixing chamber is fixed by the locking means. For example, the locking means may be at least one locking cam and a corresponding recess that interlock. Likewise, the at least one locking cam may be formed at the mixing capsule or the at least one recess may be formed at the rotary element. The locking means, such as locking cam(s), and the corresponding recess(es) for engaging the locking cams, preferably at least two recesses arranged in an angle of approximately 90°, allow setting of a transport and storage position of the first mixing chamber approximately perpendicular to the longitudinal axis of the mixing capsule, which corresponds to the first position, and a mixing and/or discharge position, in which the longitudinal axis of the first mixing chamber is coaxially locked to the longitudinal axis of the mixing capsule, which corresponds to the second position.

A guiding adapter is preferably attachable to the mixing capsule of the invention at its back end of the housing, in which a movable squeezing piston is arranged. The squeezing piston movable, preferably locked in the guiding adapter, may be moved in the guiding adapter by applying a certain force so that the locking is disengaged. The locking may consist of at least one ridge on the outer periphery of the squeezing piston being on the inside of the guiding adapter, in particular in a form-locked or force-locked manner.

Preferably, the guiding adapter with movable squeezing piston may be fixed to the back end of the capsule housing by means of a bayonet catch, a screw connection or clip connection or other measures known by the person skilled in the art. In this context, it may be preferred for the squeezing piston to be inserted into the recess of the sealing piston before fastening the guiding adapter, and the sealing piston may be pushed along the first mixing chamber into the capsule housing to subsequently fasten the guiding adapter to the back end of the capsule housing. According to the invention, the sealing piston is pushed into the capsule housing in the direction toward the discharge opening by plugging on the guiding adapter with squeezing piston. In this position, the mixing capsule may be inserted in usual applicators for PLT (compules). The stroke in the mixing capsule considering the maximum stroke of usual applicators could be increased by displacing the sealing piston during plugging on the guiding adapter.

Another subject matter of the invention is a mixing capsule with capsule housing, wherein a sealing piston is arranged in the capsule housing at its back end which in particular seals, preferably air-tightly and/or moisture-tightly, the mixing capsule at its back end. In this context, it is preferred for the sealing piston to be passable through the first mixing chamber or the hollow pipe section and a second mixing chamber along the longitudinal axis (Z) of the mixing capsule, preferably through the common mixing chamber, when the first mixing chamber or the pipe section is substantially coaxially oriented to the longitudinal axis (Z) of the mixing capsule, wherein preferably the first and the second mixing chamber form a common mixing chamber. Preferably, the sealing piston is on the inside of the back end of the housing. Preferably, the sealing piston is slidably arranged along the longitudinal axis of the mixing capsule, and seals the mixing capsule at its back end, preferably air-tightly and/or moisture-tightly. The sealing piston is preferably arranged in an opening at the back end of the capsule housing.

Preferably, the second mixing chamber is formed by a region in the front central region of the capsule housing. Alternatively, the second mixing chamber may also be arranged in the back region of the capsule housing. The first mixing chamber is located in the rotatably mounted pipe section or the rotatably mounted one-side closed sleeve having a bottom, wherein the bottom of the one-side closed sleeve is detachable from the sleeve by means of the sealing piston to push the sealing piston through the sleeve. Provided that the first mixing chamber is in a rotatably mounted pipe section, in particular a hollow pipe section, the sealing piston may be pushed through the pipe section and optionally the second mixing chamber in the second position, when the axis of the first mixing chamber, in particular of the hollow pipe section, is coaxially oriented to the longitudinal axis of the mixing capsule.

Another subject matter of the invention is a mixing capsule, in which, in an alternative, the movable sealing piston is reducible in its diameter, in particular the diameter (D1) of the sealing piston is substantially reducible to diameter (D2). For this purpose, the sealing piston preferably carries lamellae at its outer periphery. In a further alternative, the sealing piston may have a fixed diameter. Preferably, the sealing piston according to the invention has a recess at its side averting the mixing chamber, into which the front region of the squeezing piston is insertable. Further, the sealing piston preferably has at least one, preferably radially protruding, lamella at its outer periphery. According to a preferred alternative, the sealing piston has two to a multitude of lamellae at the outer periphery. Preferably, the lamellae may be made of an elastic material, e.g. TPE (thermoplastic elastomer) or be elastic due to their geometry. The lamellae form an integral component with the sealing piston preferably. Further, the lamellae may be formed with a phase on one side at the outer periphery or on both sides. The lamellae may be made from the same material as the sealing piston, or from a silicone or another suitable material also.

The sealing piston preferably has at least in in part a defined surface roughness on the side facing the mixing chamber. Preferably, the side facing the mixing chamber has an area of a defined size, preferably a circular area having surface roughness. The surface roughness may be produced by means of eroding, material ablative processes, such as sand blasting, etching or also material generative processes etc. The surface roughness preferably amounts to a roughness (average roughness) Ra of 3.5 µm (micrometers) to 30 µm, preferably of 6 µm to 24 µm, preferably of 8 µm to 20 µm, particularly preferably of 10 to 20 µm, alternatively about 10 µm with +/−2.5 µm. Alternatively, the roughness of the erosion structure may have the identifier 30, 33, 36, 39 or 42 according to VDI 12 3400. Likewise, the capsule housing or the pipe section may be provided, where necessary, at least in part to completely with a defined surface roughness.

Further, the mixing capsule has a) the discharge opening at its housing. The discharge opening is preferably formed in as integral part of the capsule housing a discharge spout. Alternatively, a discharge opening b) may be arranged in a discharge spout being fixable to the capsule housing. The discharge spout is preferably curved and has a form as known mixing capsules or carpules, respectively, like this, for example, it has a form allowing discharging of the dental material into a tooth cavity.

According to a further alternative, it is preferred for at least one resistance means to be integrally formed inside the discharge nozzle in the front or back region in front of the outlet, preferably the resistance means is designed such that it may drive a change of the viscosity of the composition to be discharged and/or additional mixing of the composition to be discharged. In preferred embodiments, the resistance means is a wall not extending over the whole diameter, or at least one nose.

The material from which the individual parts of the mixing capsule, such as the capsule housing, the discharge spout, the rotary element, the pipe section, the sleeve, the sealing piston, the guiding adapter, the squeezing piston and/or the resistance means consist of preferably comprises a tribological-modified plastic material, such as PBT-POM, polybutylene terephthalate (PBT), polyoxymethylene (POM), PC (polycarbonate), as well as plastics comprising organic and/or inorganic fillers, such as, for example the following additives, such as silicone oil, graphite (GR), fluorocarbon (TF), carbon fibers (CF), $MoS_2$ (MO), polyolefin waxes or other solid lubricants. Likewise suitable materials to produce the aforementioned capsule parts may be selected from a polymeric material, filled polymeric material, a fiber-reinforced polymer, hybrid material wherein the polymeric material may be selected from polycarbonate, polyamide, fluoropolymers, polysulfide-containing polymers, polysulfone-containing polymers, polyaryl ether ketones, polyimides, PAEK (polyaryl ether ketones), PEEK (polyether ether ketones), PEK (polyether ketones), PEKK (polyether ketone ketones), PEEEK (polyether ether ether ketones), PEEKK (polyether ether ketone ketones), PEKEKK (polyether ketone ether ketone ketones), PES (polyether sulfones), PPSU (polyphenylene sulfones), Polyaryl sulfones, PSU (polysulfones), PPS (polyphenylene sulfides), PFA (perfluoroalkoxy polymers), PFE (polyfluorenylene ethynylene polymers), PVDF (polyvinylidene fluorides), PTFE (polytetrafluoroethylenes), PAI (polyamide imides), PI (polyimides), PEI (polyether imides), PBI (polybenzimidazoles). The squeezing piston preferably is manufactured form polycarbonate. The sealing piston may preferably be manufactured from a TPE (thermoplastic elastomer) having a hardness of 60-100 Shore A, preferably 70-90 Shore A. A preferred TPE may comprise TPE-S, such as SEBS, styrene-ethene butene-styrene-block copolymer.

According to a further embodiment, a subject matter of the invention is a method for mixing at least two composition A and B into a composition C in the mixing capsule according to the invention, in particular of pasty, kneadable to solid, preferably thixotropic compositions, particularly preferably of dental compositions, comprising the steps of (i) transferring the mixing capsule from a a) first position into a b) second position by the pipe section, in particular from a non-coaxial position of its longitudinal axis to the longitudinal axis of the capsule, preferably a position approximately perpendicularly arranged to the longitudinal axis, being rotated in the direction towards the longitudinal axis (Z) of the capsule housing, in particular being rotated substantially coaxially to the longitudinal axis (Z) of the capsule housing, by rotating the rotary element with the pipe section in which the mixing chamber and composition B is located about its rotational axis (Y), so that the first mixing chamber comprising composition B and the second mixing chamber in the capsule housing comprising composition A form a common mixing chamber, (ii) mixing compositions A and B with each other, wherein, in particular, the mixing capsule is in the second position b), and (iii) obtaining composition C.

The (iv) discharging of composition C from the mixing capsule is preferably made, with the steps of (iv.1) fixing the guiding adapter with movable squeezing piston at the back end of the capsule housing, and optionally (iv.2) pushing the squeezing piston into the capsule housing of the mixing capsule along with the sealing piston, preferably until the sealing piston is pressed against the front inner wall of the capsule housing, so that the sealing piston is pushed through the common mixing chamber by the squeezing piston.

In the method according to the invention, the mixing capsule preferably is a) in a first position when the longitudinal axis (Z1) of the pipe section is preferably twisted by approximately at least 30° preferably by approximately 90° to the longitudinal axis (Z) of the capsule housing so that the first mixing chamber, in particular comprising composition B, and the second mixing chamber, in particular comprising composition A, are separated from each other, or wherein the mixing capsule b) is in a second position, for example a mixing position, when the longitudinal axis of the pipe section is preferably substantially coaxial to the longitudinal axis of the capsule housing so that the first mixing chamber and the second mixing chamber form a common mixing chamber, in particular comprising compositions A and B, or wherein the mixing chamber in position b) is also in a discharge position c) when the guiding adapter with movable squeezing piston is arranged at the back end of the capsule housing, wherein the movable squeezing piston may displace the sealing piston through the common mixing chamber in the direction toward the outlet or the discharge opening, or the sealing piston may be slid against the front inner wall of the capsule housing. Thereby, composition C is preferably pushed by the sealing piston in the direction toward the discharge opening and may be applied through the discharge opening.

During mixing, the mixing capsule is oscillatingly moved at least along a part of the longitudinal axis of the mixing capsule or the capsule housing, respectively. Preferably, the mixing capsule is oscillatingly moved with a part of its longitudinal axis along a circular orbit having a radius.

For mixing composition A and B, the guiding adapter with movable squeezing piston preferably is not yet fixed to the back end of the capsule housing.

In an alternative, the pipe section is formed as one side-closed sleeve with bottom in which the first mixing chamber and composition B is located, wherein the bottom of the sleeve may be displaced into the sleeve by the sealing piston after mixing, in particular the bottom may be displaced to the front end of the capsule housing. The bottom of the sleeve may be formed like a foil and may comprise predetermined breaking points. According to a preferred embodiment, the first mixing chamber is formed from a both-sided open pipe section.

Further, a subject matter of the invention is the use of a mixing capsule with a capsule housing, wherein the capsule housing has an opening to receive a rotary element comprising the first mixing chamber, an opening located in the back region to receive a sealing piston and a discharge opening located in the front region, wherein the rotary element comprising the first mixing chamber is arranged in the opening to receive the rotary element, in particular the rotatably mounted rotary element and the first mixing chamber preferably being in the form of a pipe section or a one-side closed cylindrical sleeve form a one-piece component, in particular an integral component, wherein the sealing piston is arranged in the opening located in the back region, apart from that the capsule housing preferably has a consistently closed capsule housing, in particular an integral capsule housing, wherein the first mixing chamber is rotatable in the mixing capsule in a first position for storing and in a second position for mixing and applying, by rotating the rotary element about its rotational axis (Y), wherein the rotational axis (Y) is approximately perpendicularly arranged to the longitudinal central axis (Z) of the capsule housing of the mixing capsule, wherein the first mixing chamber with the second mixing chamber forms a common mixing chamber in the second position.

Further, a subject matter of the invention is the use of the mixing capsule for storing, mixing and applying (discharging) pasty to kneadable or solid dental two-component compositions. Preferably, the mixable compositions are thixotropic dental compositions.

BRIEF DESCRIPTION OF THE DRAWINGS

The embodiments shown in the following figures show exemplary subject matters according to the invention, without limiting the invention to these subject matters.

The figures show:

FIGS. 2a and 2b: as FIG. 1, wherein FIG. 2a is a sectional view taken along line 2a-2a in FIG. 2b, and FIG. 2b is a top view of FIG. 1.

FIGS. 6a, 6b, 6c: rotary elements with pipe section, wherein FIG. 6b is a sectional view taken along line 6b-6b in FIG. 6a.

FIGS. 7a, 7b, 7c and 7d: sealing piston 6, wherein FIG. 7a is a sectional view taken along line 7a-7a in FIG. 7b.

FIGS. 8a, 8b: squeezing piston 8, wherein FIG. 8b is a sectional view taken along line 8b-8b in FIG. 8a.

FIG. 9: guiding adapter 7 with bayonet catch.

FIGS. 10a and 10b: discharge spout with resistance means 9 inside.

FIG. 1 shows an empty mixing capsule 1 according to the invention with guiding adapter 7 and squeezing piston 8 in sectional view with sealing piston 6 slid forward. The mixing capsule 1 comprises a capsule housing 2 with a discharge spout 3. Further, the rotatably mounted rotary element 4.2 is shown. FIGS. 2a and 2b show a mixing capsule according to FIG. 1 in cross-section and in top view. In FIG. 2a, the first mixing chamber 5a is coaxially arranged with the second mixing chamber 5b in the mixing capsule 1 so that the sealing piston 6 is shown pushed through the first mixing chamber 5a to the second mixing chamber 5b by the squeezing piston 8 being movably mounted in the guiding adapter 7. In this position, the first and the second mixing chamber form the common mixing chamber. The back 3.3 and the central 3.2 region in the inside of the discharge spout as well as the discharge opening 3.1 are shown in the discharge spout 3. The rotary element 4.2 may be rotated about the rotational axis Y, wherein the pipe section 5.1 comprising the first mixing chamber 5a is rotated concurrently. Preferably, the rotary element has at least one opening 4.1, such as in FIG. 11d, on the outer surface, into which at least one handhold element 13, such as shown in FIGS. 11a, 11b and 11c, is insertable or lockable. The longitudinal axis Z of the mixing capsule is indicated in FIG. 2b. The front region 8.1 of the squeezing piston is inserted into the recess 6.4 in the sealing piston 6. The central region 8.2 of the squeezing piston 8 serves for guiding the piston in the mixing chamber. The back region 8.3 may be further pushed in the direction of the mixing chamber by an external tool. The lamellae 6.1 and 6.2 of the sealing piston 6 are on the inside of the mixing chamber.

FIGS. 3a, 3b and 3c, 3d show a mixing capsule 1 in sectional view in the first position (sale/storage position) comprising composition B in the first mixing chamber 5a and composition A in the second mixing chamber 5*b*. The longitudinal axis Z1 of the first mixing chamber or pipe section, respectively, is approximately perpendicularly shown to the longitudinal axis Z of the capsule or the capsule housing, respectively. A sealing means 2.4 is integrally formed at the capsule in the back region, such as e.g. a bayonet catch 2.4. Further, FIGS. 3*b* and 3*d* show the guiding adapter 7 with inserted squeezing piston 8. The squeezing piston is locked with the adapter by locking means 8.4 such as ridges or cams or noses 8.4, respectively, circumferenting at the outer periphery in the upper region of the squeezing piston. FIG. 3*c* shows a pipe section 5.1 with first mixing chamber 5*a*, whose longitudinal axis Z1 is rotated to the longitudinal axis Z of the capsule by 90°. Composition A is shown in the second mixing chamber 5*b*. In FIGS. 4*a*, 4*b* and 4*c*, the second position of the mixing capsule 1 is shown in which the first mixing chamber 5*a* and the second mixing chamber 5*b* are coaxially arranged to each other. In the second position, compositions A and B may be mixed with each other in the formed total mixing chamber 5*a* and 5*b*. In this embodiment, the pipe section 5.1 with the rotary element 4.2 forms an integral component. The rotary element 4.2 is rotatably locked with the capsule housing 2 in the opening 14 to receive the rotary element. The end of the pipe section 5.1 is close to the inside wall 12 of the housing. The front circumferential lamella 6.1 of the sealing piston 6 is shown in FIG. 4*c*.

In FIGS. 5*a*, 5*b*, 5*c*, 5*d* and 5*e*, the mixing capsule 1 with mixed composition C is shown in a section view. The squeezing piston 8 is inserted into the recess 6.4 of the sealing piston 6 and pushed through the first mixing chamber 5*a* to the second mixing chamber 5*b*. Composition C may now be applied from the mixing capsule 1 by further driving the squeezing piston 8 as well as the sealing piston 6. In this position, the sealing piston is still present with a diameter D1 with protruding lamellae, as shown in FIG. 5*c*. Upon further driving the sealing piston, the lamellae attach to the outside of the sealing piston 6 and the diameter of the sealing piston decreases to diameter D2, as shown in FIGS. 5*d* and 5*e*.

FIGS. 6*a*, 6*b*, 6*c* show the rotary element 4.2 with pipe section. The rotary element 4.2 comprises the pipe section 5.1 forming the first mixing chamber 5*a*. The pipe section 5.1 or the one-side closed cylindrical sleeve 5.1 has, at least in part, an arched contour at their open ends 10 at two opposing shell surfaces.

Preferably, the rotary has an additional handhold element (not shown) on the outer surface. The handhold element preferably shows the position of the first mixing chamber. When the handhold element is coaxially arranged to the longitudinal axis of the capsule housing, the first mixing 5*a* is coaxially arranged to the longitudinal axis of the capsule housing also. The second position, i.e. mixing and/or discharge position, is shown. When the handhold element is perpendicularly orientated to the longitudinal central axis of the capsule housing, the first position, i.e. transport and/or storage position, is displayed.

Figure 1:
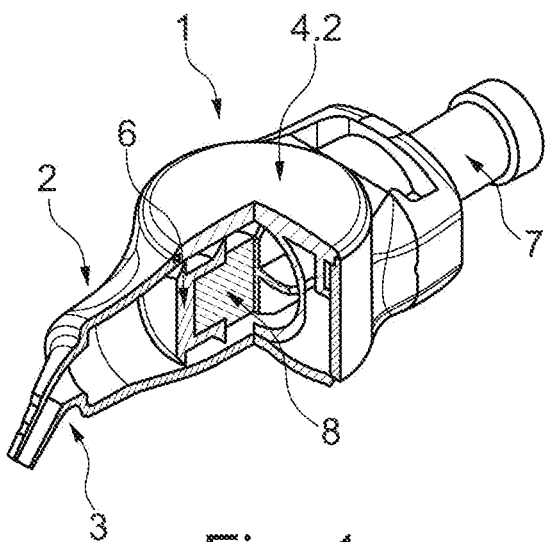
FIG. 1: mixing capsule 1 according to the invention (empty) with guiding adapter 7 in sectional view and sealing piston 6 slid forward.
Figure 2A:
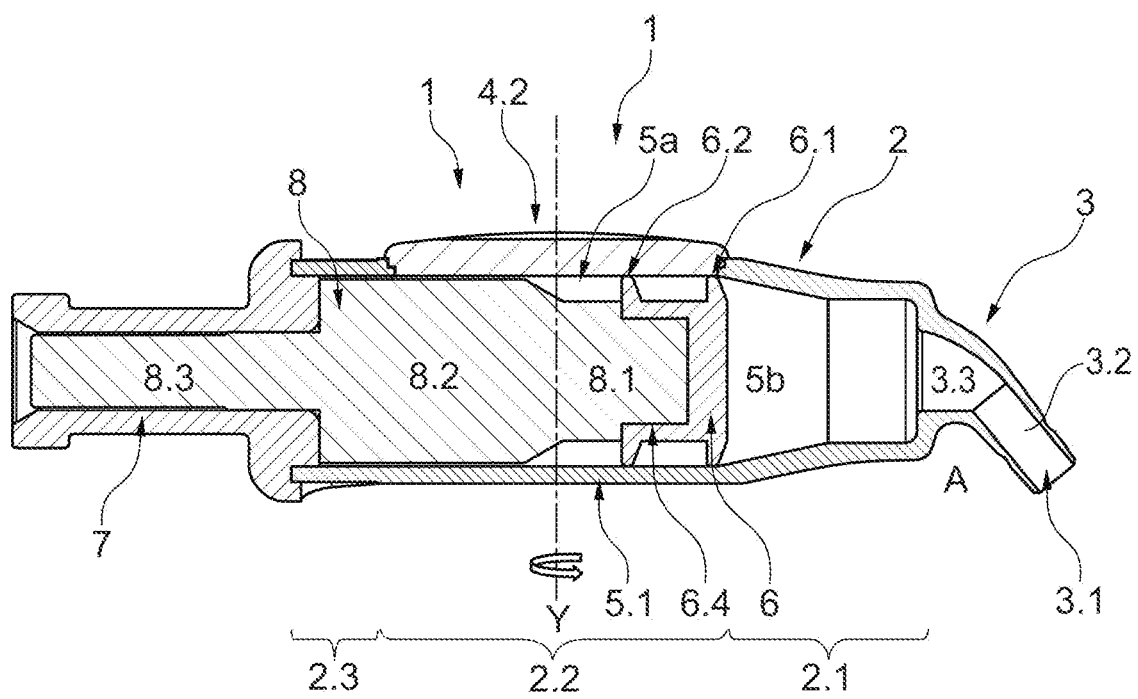
Figure 2B:
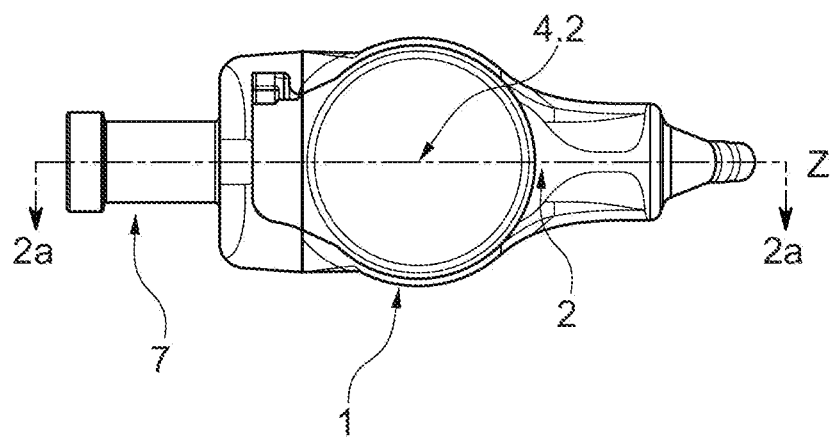
Figure 3A:
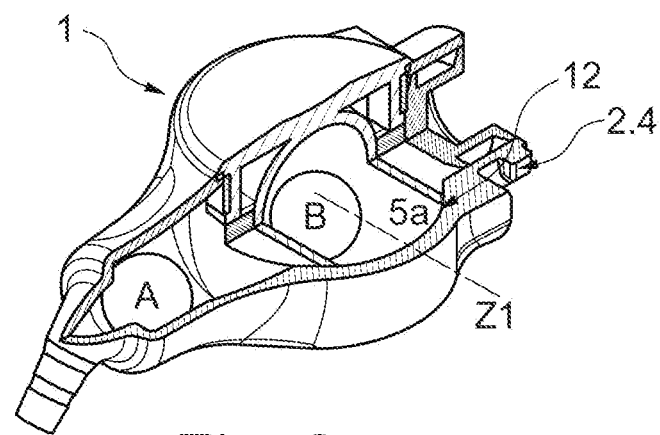
FIGS. 3a, 3b, 3c, and 3d: mixing capsule 1 in sectional view in first position (storage position) with compositions A and B—with guiding adapter 7 and squeezing piston 8 not being fixed.
Figure 3B:
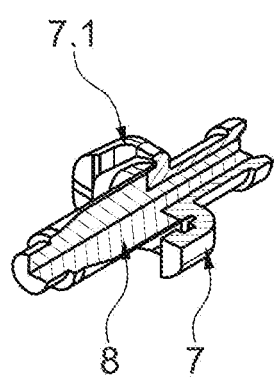
Figure 3D:
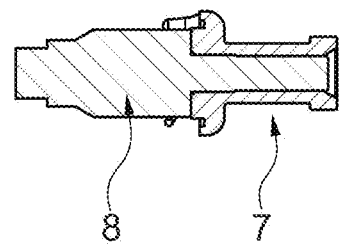
Figure 3C:
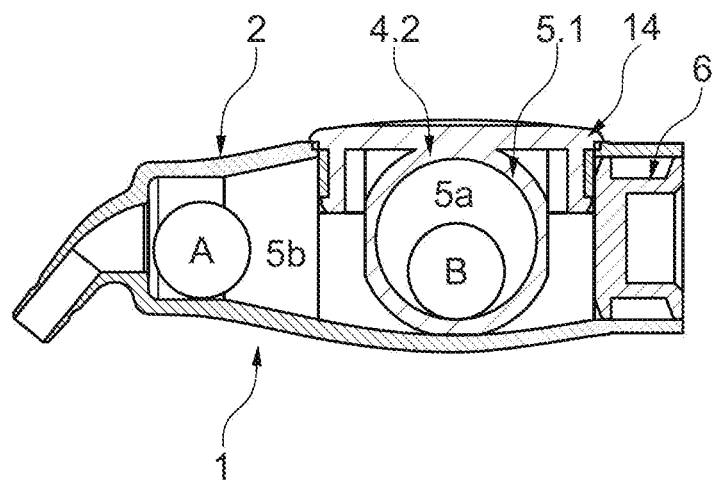
Figure 4A:
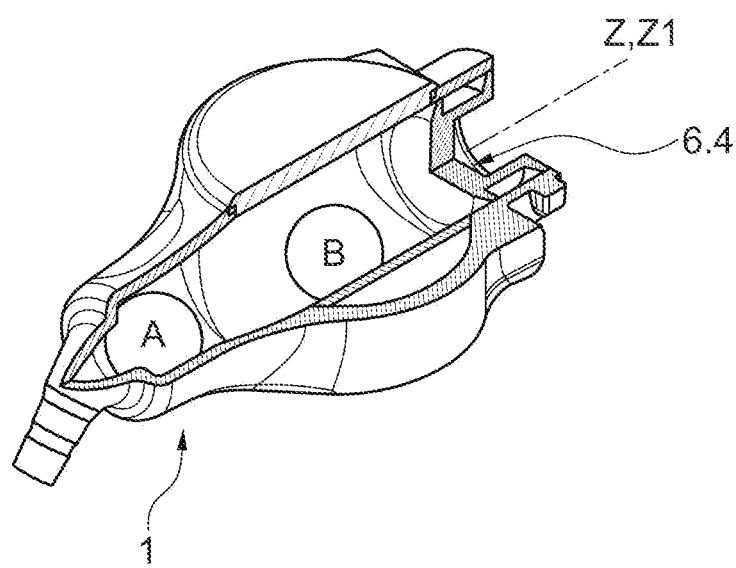
FIGS. 4a, 4b and 4c: sectional view of the mixing capsule 1 in second position with coaxial orientation of the first and second mixing chamber 5a and 5b.
Figure 4B:
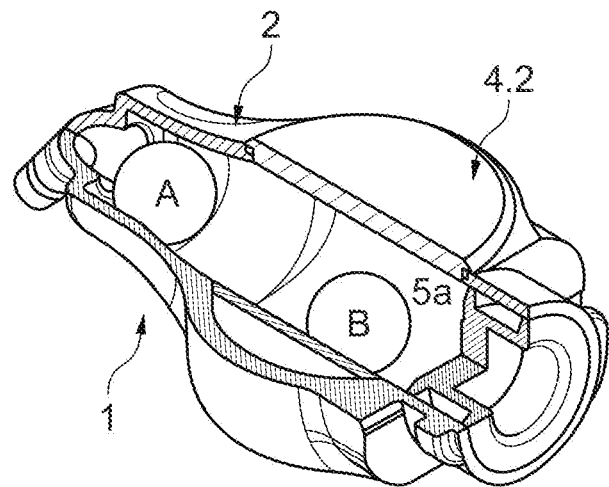
Figure 4C:
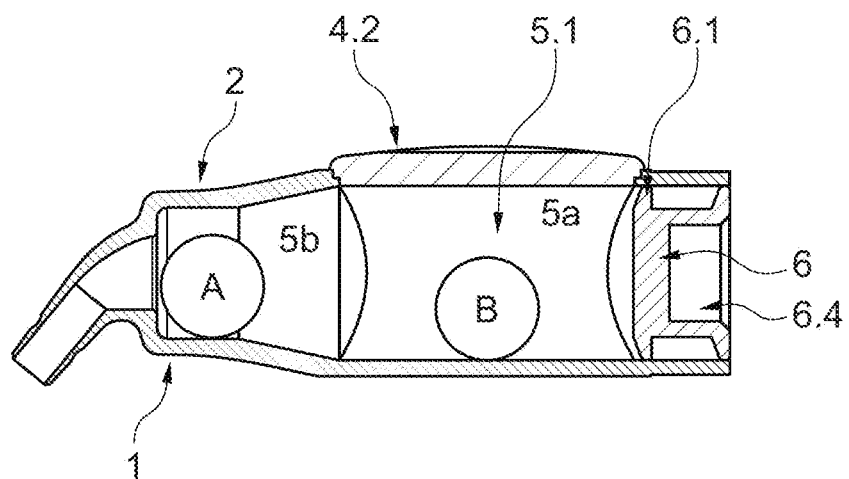
Figure 5A:
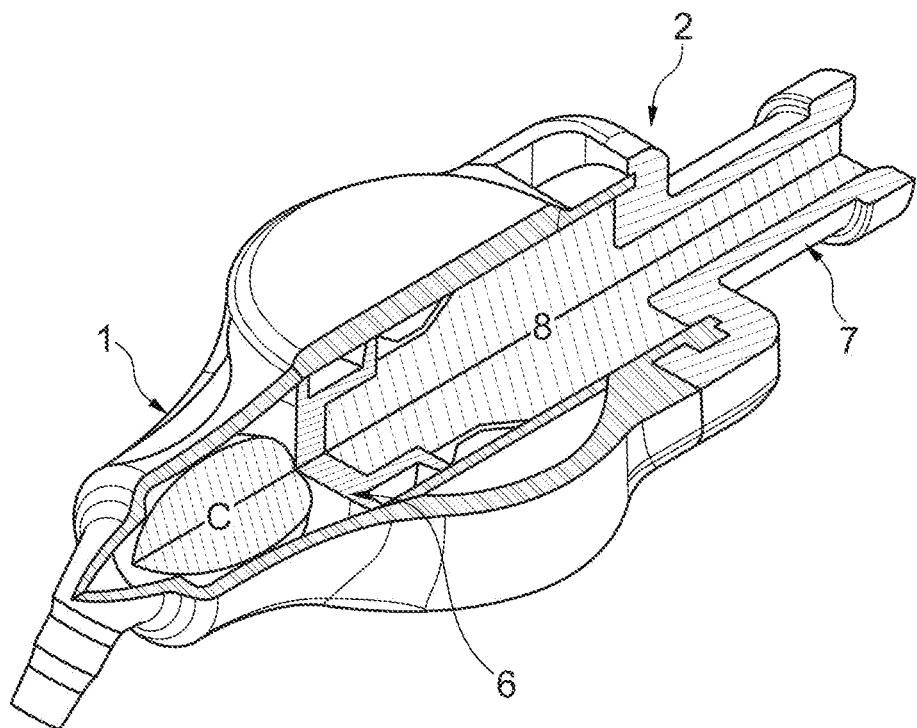
FIGS. 5a, 5b and 5c: mixing capsule 1 with mixed composition C ready for application with attached guiding adapter 7 and squeezing piston 8.
Figure 5B:
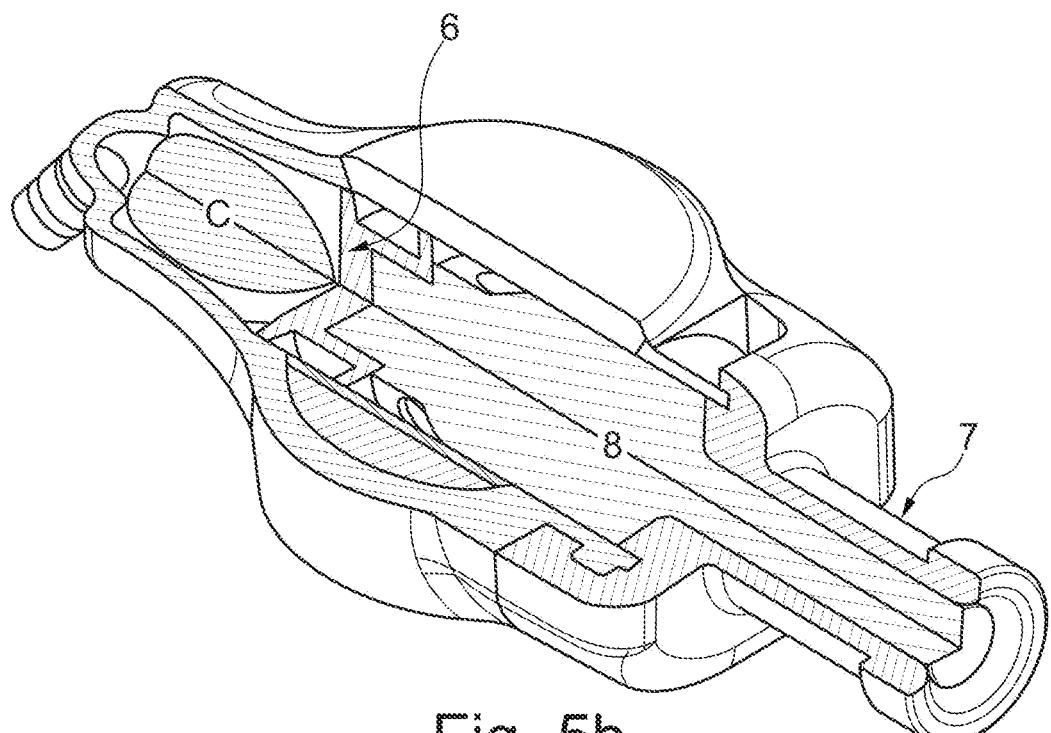
Figure 5C:
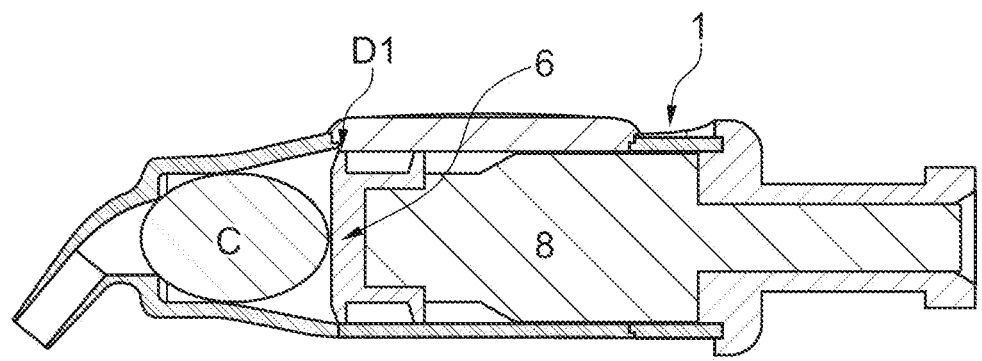
Figure 5D:
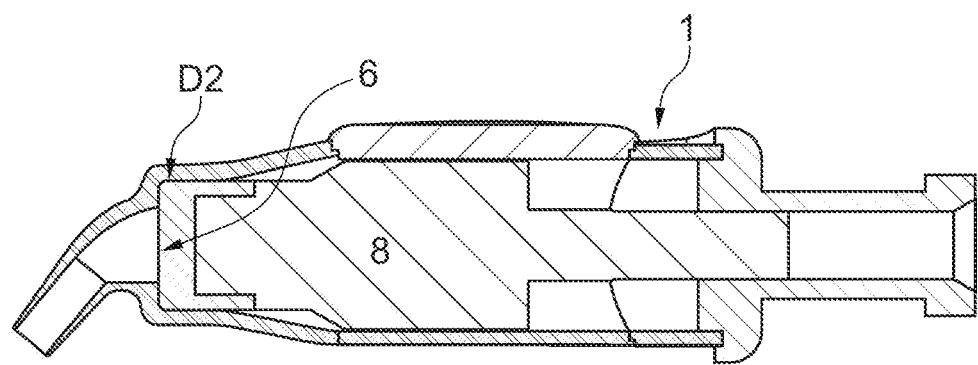
FIGS. 5d and 5e: mixing capsule in a position in which application of composition C is already done with sealing piston completely slid forward and squeezing piston.
Figure 5E:
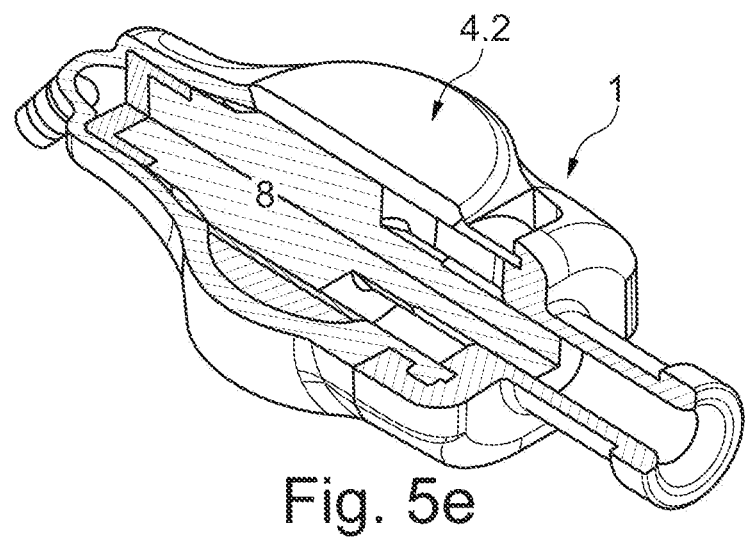
Figure 6A:
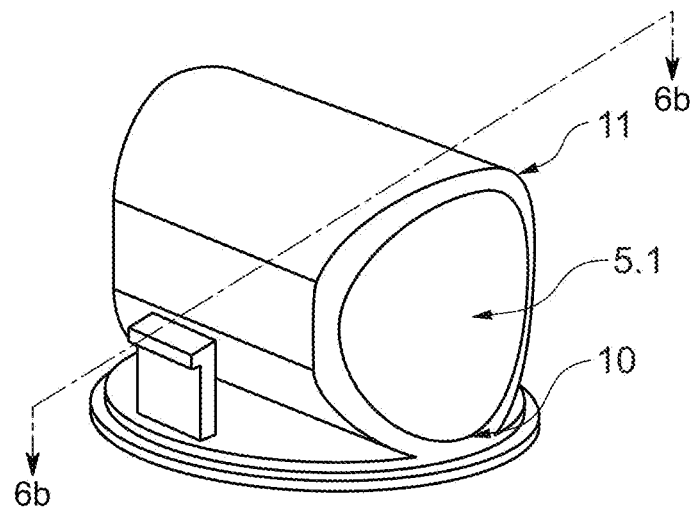
Figure 6B:
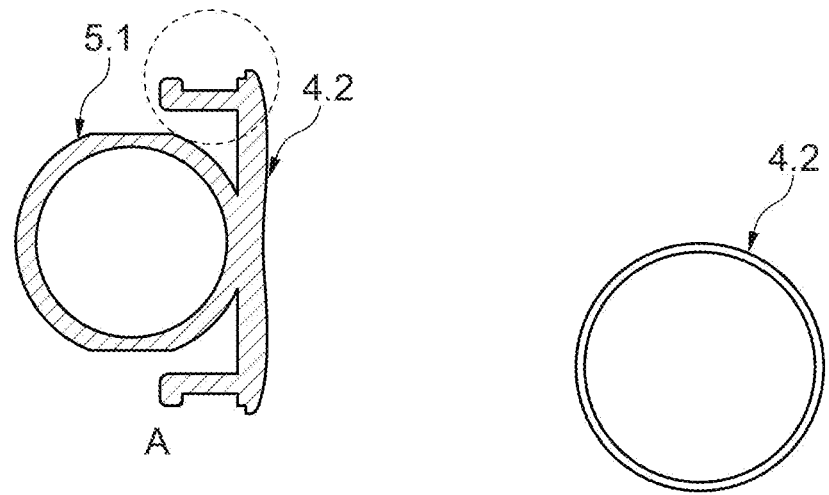
Figure 6C:
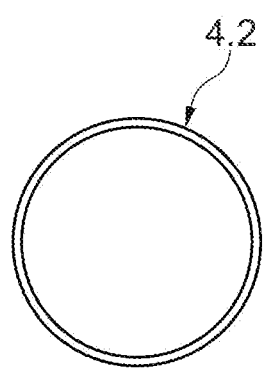
Figure 7A:
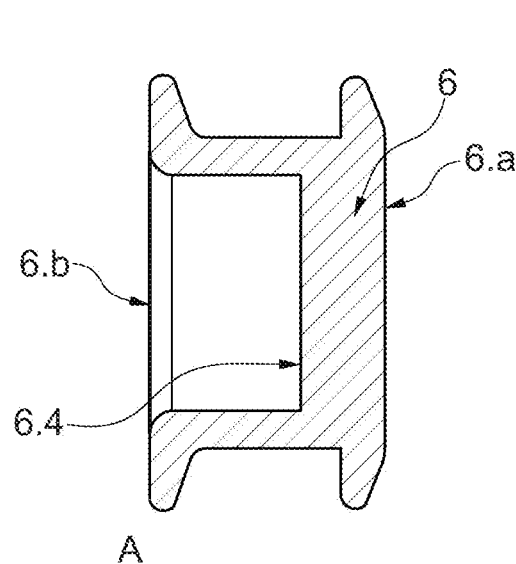
Figure 7B:
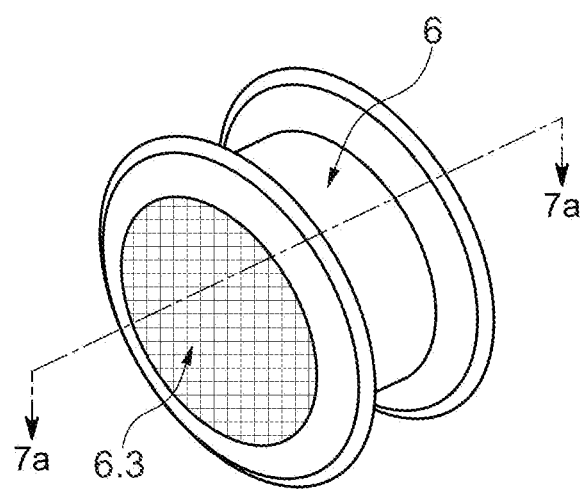
Figure 7C:
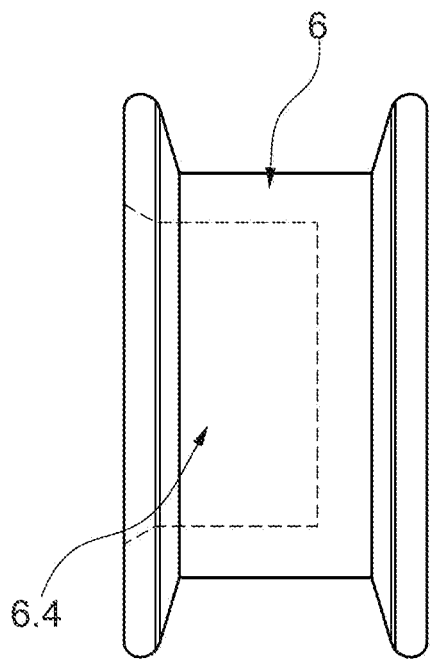
Figure 7D:
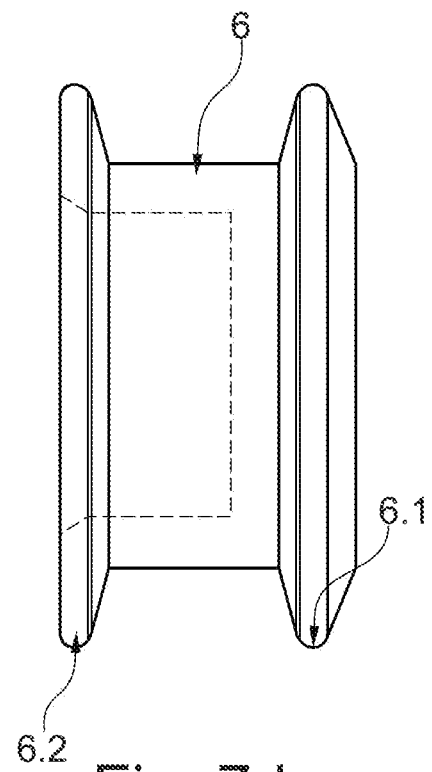

In FIGS. 7*a*, 7*b*, 7*c* and 7*d*, the sealing piston 6 is shown, wherein FIGS. 7*a* and 7*c* show the recess 6.4 on the side 6*b* averting the mixing chamber. FIG. 7*b* shows the surface roughness 6.3 of the sealing piston on the side 6*a* facing the first mixing chamber 5*a*. The single- or double-phase lamellae 6.1 and 6.2 are shown in FIG. 7*d*. In FIGS. 8*a*, 8*b* and 9, the squeezing piston 8, preferably being manufactured from PC (polycarbonate), with its front 8.1, central 8.2 and back region 8.3 is shown, wherein knobs being on the inside of the guiding adapter 7 are shown in top view in FIG. 8*b*.

Figure 11A:
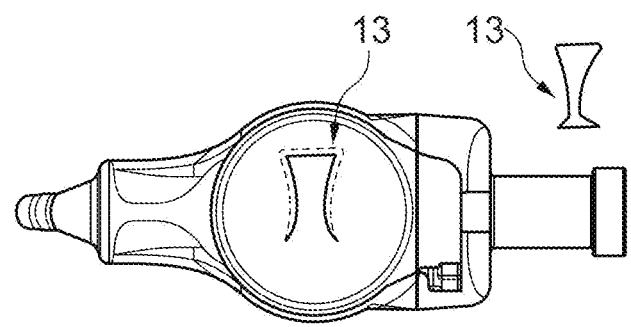
FIGS. 11a, 11b, 11c, 11d, 11e, 11f, 11g, and 11h: various rotary elements 4.3 to which various handhold elements 13 are attachable or integrally formed.
Figure 11B:
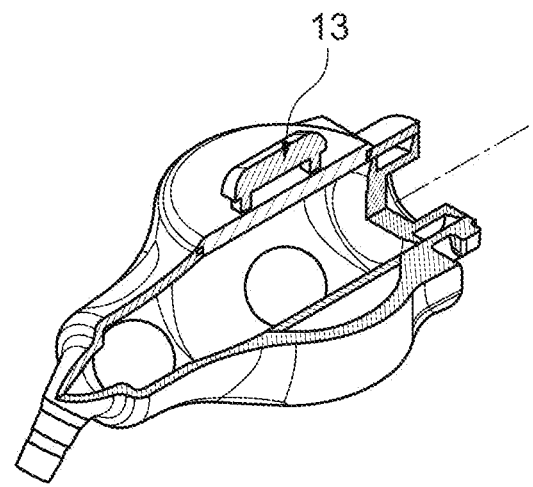
Figure 11C:
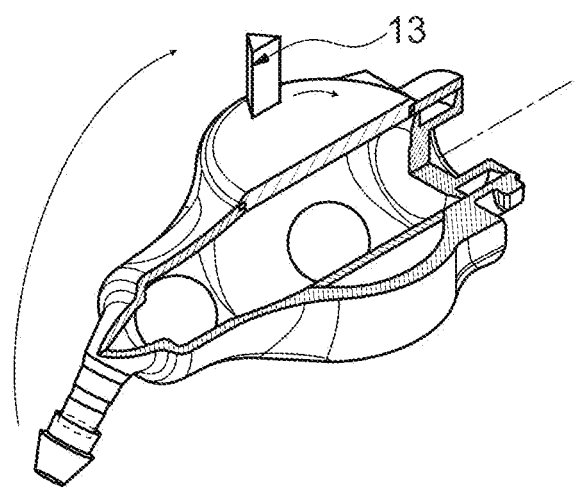
Figure 11D:
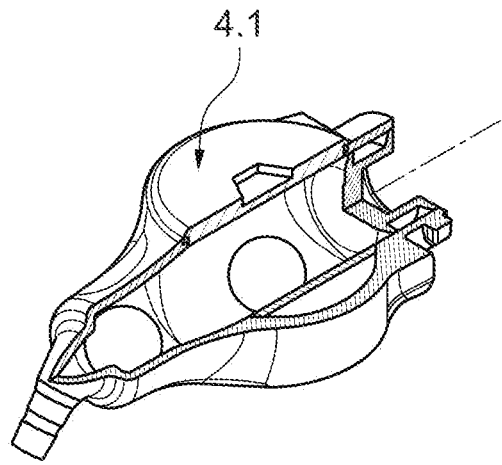
Figure 11E:
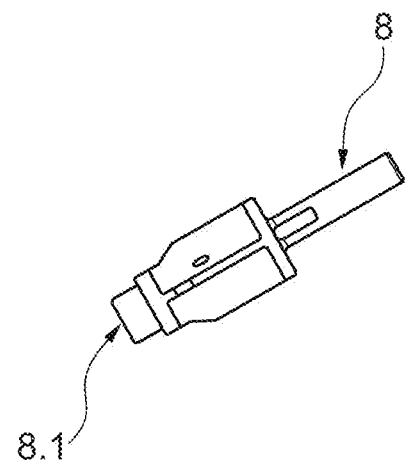
Figure 11F:
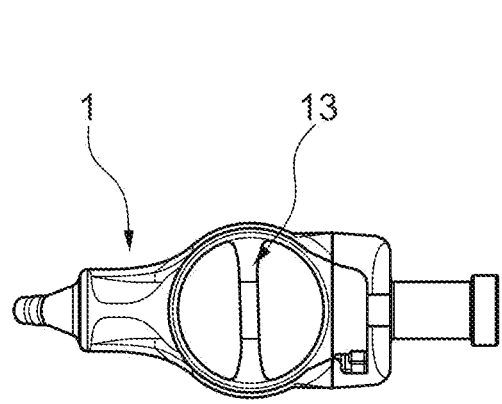
Figure 11G:
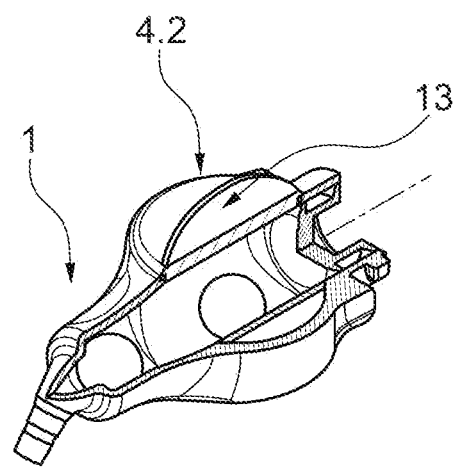
Figure 11H:
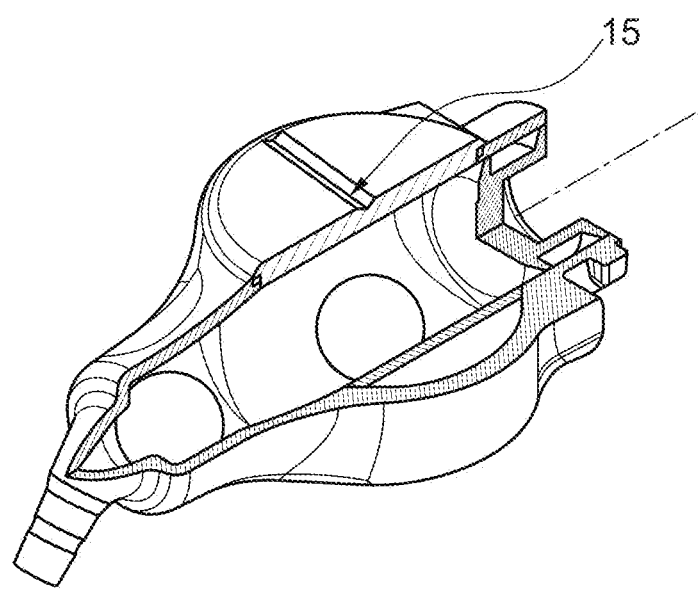

FIG. 9 shows a means 7.1 for fixing the guiding adapter, such as a bayonet catch 7.1, at the housing of the mixing capsule 2. In FIGS. 10*a* and 10*b*, the reference means 9 are shown, which may be formed as a partial wall or nose(s) protruding inwardly and being directed in the direction of the mixing chamber. FIGS. 11*a*, 11*b*, 11*c*, 11*d*, 11 *e*, 11*f*, and 11*g* show various embodiments of the separate handhold elements 13 which may be attached to the rotary element, or a rotary element with integral flat handhold element 13 approximately perpendicularly extending to the surface of the rotary element. FIG. 11*d* shows a rotary element with central opening 4.1 on the upper side to receive the front region 8.1 of the guiding piston by means of which the rotary motion may be performed. According to an alternative, the rotary element 4.2 has a hexagonal opening 4.1, in particular a polygon socket opening, into which the squeezing piston 8 is insertable with its front region 8.1 having a hexagonal profile. In FIG. 11*f*, an approximately perpendicularly protruding flat or outwardly running handhold element 13 extends on the rotary element, being integral with the rotary element 4.2 or being insertable into recesses of the rotary element via protrusions. FIG. 11*h* shows a rotary element having a groove 15 into which an elongated auxiliary means may engage in order to effect the torque to perform the rotary motion of the rotary element. The groove may extend over the diameter of the rotary element and may have virtually any useful profiling, such as also a hollow profile, into which an auxiliary means may engage.

REFERENCE SIGNS 1 mixing capsule
2 capsule housing; 2.1 front end; 2.2 central region, 2.3 back end of the capsule housing 2, 2.4 locking means, such as bayonet catch
3 discharge spout, 3.1 discharge opening; 3.2, 3.3 inside the outlet; 3.2 front region, 3.3 back region in inner discharge spout 3
4.1 opening in the rotary element, in particular centrally arranged opening
4.2 rotatably mounted rotary element
5*a* rotatably mounted first mixing chamber; 5*b* second mixing chamber; 5*a*+5*b* total mixing chamber; 5.1 pipe section, in particular cylindrical sleeve or cylindrical one-side closed sleeve 5.1
6 sealing piston, 6*a* side facing the mixing chamber 5*a*, side averting the mixing chamber 6*b* 6.1 lamella, at the side 6*a* facing the mixing chamber, 6.2 lamella, at the side 6*b* averting the mixing chamber 5,
6.3 surface roughness of the sealing piston
6.4 recess at the side 6*b* facing the mixing chamber
7 guiding adapter, 7.1 means for fastening, such as bayonet catch
8 squeezing piston, 8.1 front region of the squeezing piston 8, 8.2 central region,
8.3 back region of the squeezing piston 8, 8.4 arresting means, such as elevation/ridge
9 resistance means, partially wall or nose(s) or spigots/tappets
10 open end(s) of the pipe section or one-side closed sleeve
11 end with curved contour, in particular circular sections
12 housing inner wall
13 separated handhold element, the handhold element is connectably and releasably fastenable with the rotary element
14 opening to receive the rotary element 15 groove to receive the torque in conjunction with an auxiliary means
D1, D2 diameter D1 of the sealing piston is substantially reducible to diameter D2
Y rotational axis of the rotary element (4.2) and/or of the mixing chamber 5a
Z longitudinal axis of the capsule, Z1 longitudinal axis pipe section
A pasty or kneadable dental composition (component A)
B pasty or kneadable dental composition (component B)
C mixed pasty or kneadable dental composition (mixture of components A and B)

The invention claimed is:

1. A two-component mixing capsule for intake and for mixing of two compositions with a capsule housing having a discharge opening at its front end,
wherein
the mixing capsule comprises a rotary element rotatably mounted in the capsule housing, a rotational axis of the rotary element being approximately perpendicularly arranged to a longitudinal axis of the mixing capsule, and a rotatably mounted first mixing chamber being assigned to the rotary element in the capsule housing, and a second mixing chamber being arranged in the capsule housing, a sealing piston being arranged in the capsule housing at a back end of the capsule housing, and the sealing piston being passable through the first mixing chamber and the second mixing chamber along the longitudinal axis of the mixing capsule when the first mixing chamber is rotated to be coaxially oriented with the longitudinal axis of the mixing capsule.

2. The mixing capsule according to claim 1, wherein the capsule housing is a one-piece integral component.

3. The mixing capsule according to claim 1, wherein
a) the capsule housing has an opening to receive the rotary element, an opening to receive the sealing piston and a discharge opening, optionally the capsule housing otherwise has a continuously closed housing wall, or
b) the capsule housing of the mixing capsule has a continuously closed housing wall on the housing wall of the capsule housing opposite the rotary element rotatably arranged in an opening of the housing wall of the capsule housing.

4. The mixing capsule according to claim 1, wherein
a) a separate handhold element is attachable to the rotary element or a separate handhold element or a squeezing piston is insertable into the rotary element, or b) the rotary element additionally has an integral handhold element, or c) the rotary element has a groove.

5. The mixing capsule according to claim 1, wherein
the first mixing chamber is arranged at the rotary element rotatably mounted in the capsule housing, and optionally the rotatably mounted rotary element and the first mixing chamber form a one-piece component.

6. The mixing capsule according to claim 1, wherein the diameter of the movable sealing piston is reducible.

7. The mixing capsule according to claim 1, wherein a guiding adapter, in which a movable squeezing piston is arranged, is attachable to the back end of the housing of the mixing capsule.

8. The mixing capsule according to claim 1, wherein
a) the discharge opening is arranged at a discharge spout, and the discharge spout is an integral part of the capsule housing, or
b) the discharge opening is a discharge spout and is fastenable to the capsule housing.

9. The mixing capsule according to claim 1, wherein the mixing capsule has a single rotary element rotatably mounted or rotatably arranged in the capsule housing.

10. The mixing capsule according to claim 1, wherein
the first mixing chamber is arranged at the rotary element rotatably mounted in the capsule housing and the rotatably mounted rotary element and the first mixing chamber being in the form of a pipe section or a one-side closed cylindrical sleeve form an integral component.

11. The mixing capsule according to claim 10, wherein
the pipe section connected to the rotatably mounted rotary element or the cylindrical one-side closed sleeve forms the first mixing chamber and a) the second mixing chamber is located in the front region in the capsule housing or b) the second mixing chamber is located in the back region in the capsule housing.

12. The mixing capsule according to claim 10, wherein
the pipe section connected to the rotatably mounted rotary element forms the first mixing chamber and the second mixing chamber is located in the front region in the capsule housing,
the mixing capsule being a) in a first position (storage) when the longitudinal axis of the pipe section is twisted by approximately 90° to the longitudinal axis of the capsule housing, so that the first mixing chamber and the second mixing chamber are separated from each other, or
the mixing capsule being
b) in a second position when the longitudinal axis of the pipe section is substantially coaxial with the longitudinal axis of the capsule housing, so that the first mixing chamber and the second mixing chamber form a common mixing chamber, or
the mixing capsule in position b) being in a discharge position c) when a guiding adapter with movable squeezing piston is arranged at the back end of the capsule housing, the movable squeezing piston and a sealing piston being displaceable through the common mixing chamber in the direction toward the front end of the capsule housing or in the direction toward the back region.

13. The mixing capsule according to claim 10, wherein
the sealing piston is passable through the first mixing chamber being in the form of a pipe section and the second mixing chamber along the longitudinal axis of the mixing capsule when the mixing chamber in the form of a pipe section is coaxially oriented with the longitudinal axis of the mixing capsule.

14. A method for mixing at least two compositions A and B into a composition C in a mixing capsule according to claim 1, comprising the steps of (i) transferring the mixing capsule from a) a first position into b) a second position by a pipe section being rotated in a direction toward the longitudinal axis of the capsule housing, by rotating the rotary element with the pipe section, in which the mixing chamber and composition B are located, about its rotational axis so that the first mixing chamber comprising composition B and the second mixing chamber in the capsule housing comprising composition A form a common mixing chamber,
(ii) mixing compositions A and B with each other, by the mixing capsule being moved, and
(iii) obtaining composition C.

15. The method according to claim 14, wherein
(iv) discharging of composition C from the mixing capsule is made, with the steps of
(iv.1) fastening a guiding adapter with movable squeezing piston at the back end of the capsule housing,
(iv.2) pushing the squeezing piston into the capsule housing of the mixing capsule along with the sealing piston, so that the sealing piston is pushed through the common mixing chamber by the squeezing piston.

16. The method according to claim 14, wherein
the mixing capsule a) is in a first position when the longitudinal axis of the pipe section is twisted by approximately 90° to the longitudinal axis of the capsule housing, so that the first mixing chamber and the second mixing chamber are separated from each other, or the mixing capsule being
b) in a second position when the longitudinal axis of the pipe section is coaxial with the longitudinal axis of the capsule housing so that the first mixing chamber and the second mixing chamber form a common mixing chamber comprising compositions (A and B), or the mixing capsule in position b) being also in a discharge position c) when the guiding adapter with movable squeezing piston is arranged at the back end of the capsule housing, the movable squeezing piston and the sealing piston are displaceable through the common mixing chamber in the direction towards the discharge opening.

17. Method of using a mixing capsule with a capsule housing for mixing, wherein the capsule housing has an opening to receive a rotary element, an opening located in a back region to receive a sealing piston and a discharge opening located in a front region, the rotary element comprising a first mixing chamber being arranged in the opening to receive the rotary element and a sealing piston being arranged in the opening located in the back region,
the first mixing chamber being rotatable in a first position for storing and in a second position for mixing and applying, by rotating about the rotational axis of the rotary element, the rotational axis being approximately perpendicularly arranged to the longitudinal central axis of the capsule housing of the mixing capsule, the first mixing chamber with a second mixing chamber forming a common mixing chamber in the second position,
said method comprising placing a first substance in the first mixing chamber, placing a second substance in the second mixing chamber, rotating the rotary element to bring the first mixing chamber to the second position thereby forming the common mixing chamber and comingling the first substance with the second substance.

18. Method according to claim 17, wherein the first substance and the second substance are pasty to kneadable dental two-component compositions.

19. A two-component mixing capsule for intake and for mixing of two compositions comprising:
(a) a capsule housing comprising a discharge opening a front end of said capsule housing, a sealing piston opening at a back end of said capsule housing, and a rotary element opening between said discharge opening and said sealing piston opening;
(b) a rotary element rotably mounted in said rotary element opening, the rotary element having a rotational axis approximately perpendicular to a longitudinal axis of the mixing capsule;
(c) a first mixing chamber being defined by the rotary element;
(d) a second mixing chamber adjoining the first mixing chamber and optionally arranged in the capsule housing;
(e) a sealing piston mounted in the sealing piston opening;
wherein when the first mixing chamber is brought by the rotary element into a proper alignment with the second mixing chamber, the sealing piston is passable through the first mixing chamber and the second mixing chamber and capable of pushing contents held in a common mixing chamber formed by the first mixing chamber and the second mixing chamber along a longitudinal axis of the mixing capsule towards and, optionally, through the discharge opening.

* * * * *